United States Patent
Renkl et al.

(10) Patent No.: US 9,505,181 B2
(45) Date of Patent: Nov. 29, 2016

(54) METHOD FOR PRODUCING COMPOSITE MATERIAL COMPONENTS MADE OF PLASTIC BY A PROCESS OF HIGH-PRESSURE RESIN TRANSFER MOLDING AND PERTAINING TOOL FOR HIGH-PRESSURE RESIN TRANSFER MOLDING

(71) Applicant: KraussMaffei Technologies GmbH, München (DE)

(72) Inventors: Josef Renkl, Markt Indersdorf (DE); Stefan Ehrlicher, München (DE)

(73) Assignee: KRAUSMAFFEI TECHNOLOGIES GMBH, München (DE)

( * ) Notice: Subject to any disclaimer, the term of this patent is extended or adjusted under 35 U.S.C. 154(b) by 0 days.

(21) Appl. No.: 14/436,772

(22) PCT Filed: Aug. 13, 2013

(86) PCT No.: PCT/EP2013/066850
§ 371 (c)(1),
(2) Date: Apr. 17, 2015

(87) PCT Pub. No.: WO2014/067682
PCT Pub. Date: May 8, 2014

(65) Prior Publication Data
US 2015/0283767 A1 Oct. 8, 2015

(30) Foreign Application Priority Data

Oct. 29, 2012 (DE) .................. 10 2012 110 307

(51) Int. Cl.
*B29C 70/48* (2006.01)
*B29C 33/00* (2006.01)
(Continued)

(52) U.S. Cl.
CPC .......... *B29C 70/48* (2013.01); *B29C 33/0038* (2013.01); *B29C 33/10* (2013.01);
(Continued)

(58) Field of Classification Search
CPC ... B29C 70/36; B29C 70/48; B29C 33/0038; B29C 33/0055; B29C 33/10; B29C 45/02; B29C 45/27; B29C 45/34; B29C 45/64; B29C 70/546
See application file for complete search history.

(56) References Cited

U.S. PATENT DOCUMENTS

| 4,405,538 A | 9/1983 | Saidla |
| 4,488,862 A * | 12/1984 | Epel ...................... B29C 70/48 |
| | | 156/382 |

(Continued)

FOREIGN PATENT DOCUMENTS

| DE | 101 57 655 A1 | 6/2003 |
| DE | 10 2007 046 734 A1 | 4/2009 |

(Continued)

OTHER PUBLICATIONS

International Search Report issued by the European Patent Office in International Application PCT/EP2013/066850.
Ownes, John, N.:"Design, Fabrication, and Testing of a Composite Side Door for a Mid-Size SUV", 2006.

*Primary Examiner* — Jull Heitbrink
(74) *Attorney, Agent, or Firm* — Henry M. Feiereisen LLC.

(57) ABSTRACT

In a method for producing a shaped part, a closing movement is executed by displacing at least one of two mold halves of a high-pressure resin transfer tool from an open position into a pre-closure position of the resin transfer tool such that an opening gap between the mold halves is sealed air-tight by a sealing device of the resin transfer tool to thereby enclose a cavity. The cavity is evacuated by pumping air out of the cavity, and the closing movement is continued by displacing at least one of the two mold halves from the pre-closure position into a final closure position, in which the mold halves are sealed against one another by a further sealing device to allow filling of the cavity, enclosed by the two mold halves, with resin without leakage during a high-pressure resin transfer molding process.

17 Claims, 4 Drawing Sheets

(51) Int. Cl.
*B29C 33/10* (2006.01)
*B29C 45/02* (2006.01)
*B29C 45/27* (2006.01)
*B29C 45/34* (2006.01)
*B29C 45/64* (2006.01)
*B29C 70/54* (2006.01)
*B29L 9/00* (2006.01)

(52) U.S. Cl.
CPC .............. *B29C 45/02* (2013.01); *B29C 45/27* (2013.01); *B29C 45/34* (2013.01); *B29C 45/64* (2013.01); *B29C 33/0055* (2013.01); *B29C 70/546* (2013.01); *B29K 2713/00* (2013.01); *B29L 2009/00* (2013.01)

(56) References Cited

U.S. PATENT DOCUMENTS

| | | |
|---|---|---|
| 2010/0019405 A1 | 1/2010 | Eberth |
| 2013/0099405 A1 | 4/2013 | Kraemer |
| 2013/0328236 A1* | 12/2013 | Yamamoto .............. B29C 70/48 264/257 |

FOREIGN PATENT DOCUMENTS

| | | |
|---|---|---|
| EP | 0 230 709 | 5/1986 |
| EP | 2 639 052 A1 | 9/2013 |
| JP | 04 286610 A | 10/1992 |
| JP | 06 31756 A | 10/1992 |
| WO | 2010/150065 A1 | 12/2010 |

* cited by examiner

Section A-A

METHOD FOR PRODUCING COMPOSITE MATERIAL COMPONENTS MADE OF PLASTIC BY A PROCESS OF HIGH-PRESSURE RESIN TRANSFER MOLDING AND PERTAINING TOOL FOR HIGH-PRESSURE RESIN TRANSFER MOLDING

CROSS-REFERENCES TO RELATED APPLICATIONS

This application is the U.S. National Stage of International Application No. PCT/EP2013/066850, filed Aug. 13, 2013, which designated the United States and has been published as International Publication No. WO 2014/067682 and which claims the priority of German Patent Application, Serial No. 10 2012 110 307.0, filed Sep. 13, 2006, pursuant to 35 U.S.C. 119(a)-(d).

BACKGROUND OF THE INVENTION

The invention relates to a method for producing shaped parts, in particular composite material components made of plastic by a process of high-pressure resin transfer molding and a pertaining tool for high-pressure resin transfer molding, comprising a first mold half, a second mold half and at least one first sealing device, that is designed to seal the two mold halves off from each other in a final closure position of the tool for high-pressure resin transfer molding, in which the cavity enclosed by the two mold halves can be filled with resin without leakage during the high-pressure resin transfer molding process.

DE 10 2011 051 391 A1 describes a device for carrying out a resin transfer molding (RTM) method for the production of in particular integral components, wherein the device has an injection unit and a closable tool provided with a mold cavity, and the injection unit is able to be coupled to the tool such that an injection resin is able to be introduced into the tool, wherein the tool has at least one resin outlet closable by means of a resin flow closure unit and connected with the mold cavity, from which resin outlet injection resin can emerge after the filling of the mold.

DE 10 2009 010 692 A1 describes a method for producing a structural component, wherein for carrying out the method a pertaining device is used, wherein the method has the steps of opening the tool, inserting of fibers, in particular in the form of textiles, non-crimp fabrics, sandwich cores and/or metal inserts, closing of the tool, evacuating of the tool, injecting of the resin system, in particular of a resin hardener mixture by means of the injection installation, in particular with excess pressure, and removing of the resultant fiber composite component after hardening of the resin system. DE 10 2005 053 691 A concerns a tool for a resin transfer molding method, which tool has a cavity, a resin trap, and a transition region, wherein the cavity is arranged such that a component is able to be received in it, wherein the resin trap is integrated into the tool, and wherein the transition region is arranged such that by means of it a connection is able to be produced between the cavity and the resin trap.

SUMMARY OF THE INVENTION

It is an object of the invention to indicate an improved method for producing composite material components made of plastic by a process of high-pressure resin transfer molding and a pertaining improved tool for high-pressure resin transfer molding.

The problem is solved by a method for producing shaped parts, in particular composite material components made of plastic by a process of high-pressure resin transfer molding, having the following steps:

providing a tool for high-pressure resin transfer molding, comprising a first mold half, a second mold half, and at least one first sealing device and a second sealing device that are designed to seal the two mold halves off from each other in a closure position of the tool for high-pressure resin transfer molding, performing a closing movement by displacing at least one of the two mold halves from an open position into a pre-closure position, in which the second sealing device seals an opening gap between the first mold half and the second mold half in an air-tight manner such that the cavity enclosed by the two mold halves can be evacuated, evacuating the cavity by pumping air out of the cavity which is sealed in an air-tight manner by the second sealing device, performing a further closing movement by displacing at least one of the two mold halves from the pre-closure position into a final closure position, in which the first sealing device seals the first mold half off from the second mold half such that the cavity enclosed by the two mold halves can be filled with resin without leakage during the high-pressure resin transfer molding process.

The high-pressure resin transfer molding process, which is also designated as the RTM method (Resin Transfer Molding), represents a manufacturing method for the production of shaped parts, in particular of shaped parts which contain thermosetting and/or elastomeric molding material, in which a reactive molding material, which is also designated as resin, is introduced into a cavity of a closed molding tool. When the resin is injected into the molding tool, the method can also be designated as high-pressure resin transfer injection molding. The resin is left in the closed molding tool for the duration of a dwell time, so that the resin can react and/or harden. After the end of the dwell time, the molding tool can be opened and the finished hardened shaped part can be removed. The amount of the resin introduced into the molding tool on pressing in and, if applicable, re-pressing, is generally greater than is required for the filling of the volume of the final shaped part, in order to ensure that the shaped part is formed completely. After the removal of the finished shaped part, excess remaining molding material, which is also designated as residual cake, must then be removed before the start of a new cycle.

Generally, the shaped parts produced in the high-pressure resin transfer molding method can be composite shaped parts which are, for example, fiber-reinforced. For this, the cavity can be lined for example with non-crimp fabrics, such as layered and/or woven fiber mats. The fiber mats can contain, for example, carbon fibers, glass fibers or other types of fiber.

The tool for high-pressure resin transfer molding can also have, in addition to the first and second mold half, further mold halves if applicable, for example in order to be able to demold undercuts of the finished shape part. For opening and closing the cavity, optionally only one of the mold halves can be moved, or two, several or all mold halves can be moved chronologically one after another or simultaneously. The cavity constitutes the hollow space enclosed between the mold halves, which is filled with resin for the formation of the shaped part.

In the pre-closure position, in which the second sealing device seals an opening gap between the first mold half and the second mold half in an air-tight manner, the cavity enclosed by the two mold halves is able to be evacuated. In this pre-closure position, a dipping edge gap which is present can be opened so wide that in so doing a flow resistance of a resin flow entering into the dipping edge gap is not yet or at least not yet substantially increased with respect to its flow resistance in the cavity. In the pre-closure position, an evacuating of the cavity can take place more easily and/or more completely than would be the case if the mold halves were already moved into the final closure position, in which a flow resistance of a resin flow entering into the dipping edge gap would already be increased with respect to its flow resistance in the cavity. Here, if applicable, the risk of remaining air inclusions in the inflowing resin or respectively in the shaped part formed by the resin can be reduced. An in particular complete saturating of non-crimp fabrics introduced in the cavity can thereby also be improved. Also, through the second sealing device according to the invention, an evacuating of the cavity can begin chronologically earlier, namely already before the two mold halves have reached the final closure position. Thus, the cycle time can also be reduced and hence the production of shaped parts can become more effective, in particular more cost-efficient.

In the pre-closure position, the first sealing device lies in a not yet sealing manner against the opposite mold half.

The second sealing device or respectively flexible seal, which can be, for example, a sealing cord with a hollow chamber, therefore makes it possible to evacuate the cavity in particular in the case of a gap injection even when this is not yet completely closed. Fully compressed, i.e. with a closed mold in the final closure position, this second sealing device is additionally a security in order to guarantee a constant, reproducible mold internal pressure, in order to be able to utilize this as a control parameter.

In a further embodiment of the method, an at least partial or complete evacuation can be carried out simultaneously with the further closing movement from the pre-closure position into the final closure position. An evacuation of the cavity can thereby begin earlier chronologically, namely already before the two mold halves have reached the final closure position. Thus, also, the cycle time can be reduced and therefore the production of shaped parts can become more effective, in particular more cost-efficient.

In an alternative embodiment of the method, an at least partial or complete evacuation can be carried out in the pre-closure position before carrying out the further closing movement.

In all embodiments, the method can have the following further steps:

providing a tool for high-pressure resin transfer molding, additionally having a dipping edge gap, the gap width of which is able to be changed by adjusting the distance of the first mold half from the second mold half, performing the closing movement by displacing at least one of the two mold halves from the open position into the pre-closure position, in which the dipping edge gap has a gap width in which air is able to be evacuated from the cavity via the dipping edge gap, performing the further closing movement by displacing at least one of the two mold halves from the pre-closure position into the final closure position, in which the dipping edge gap has a reduced gap width with respect to the pre-closure position, in which a flow resistance of a resin flow entering into the dipping edge gap is increased with respect to its flow resistance in the cavity.

A gap width of the dipping edge gap can be altered here by adjusting the distance of the first mold half from the second mold half, such that after performing a closing movement by displacing at least one of the two mold halves from the open position into the pre-closure position, the dipping edge gap has a gap width in which air is able to be evacuated from the cavity via the dipping edge gap, and in so doing a flow resistance of a resin flow entering into the dipping edge gap is not yet increased, or at least not substantially increased, with respect to its flow resistance in the cavity, and after performing a further closing movement by displacing at least one of the two mold halves from the pre-closure position into the final closure position, the dipping edge gap has a reduced gap width with respect to the pre-closure position, in which a flow resistance of a resin flow entering into the dipping edge gap is increased with respect to its flow resistance in the cavity.

The dipping edge gap can contain a deflection here, and in this respect can also form a tail-off section. A deflection produces a plane offset, which facilitates the positioning of the non-crimp fabric, especially in the method of melt deposition. In the case of a possible malfunction, such as for example an overfilling or too small a closing pressure, the deflection can prevent the resin or respectively the matrix from emerging in an unbraked manner directly out from the tool, which could constitute a risk of injury.

The gap in the deflection can be constructed in its entire length or partially to be so narrow that the resin or respectively the matrix material which arrives into this region at the end of injection tails off, i.e. the gap is wide enough for venting. However, such a high counter-pressure is generated by the viscous matrix material that the flow front comes to a standstill. If a portion of the deflection section is embodied about an angle of 90° to the separation plane, this region of the gap also acts in the case of gap injection, i.e. with a still not completely closed tool.

Alternatively or additionally, the method can have the following further steps:

providing a tool for high-pressure resin transfer molding, additionally having a squeezing edge, which is constructed to fix a non-crimp fabric, arranged in the cavity, between the two mold halves in correct position for a saturating with resin, performing the closing movement by displacing at least one of the two mold halves from the open position into the pre-closure position, in which the non-crimp fabric is fixed by means of the squeezing edge on the one hand between the two mold halves in the correct position for a saturating with resin, and on the other hand remains sufficiently permeable to air for the evacuating of the cavity, performing the further closing movement by displacing at least one of the two mold halves from the pre-closure position into the final closure position, in which the non-crimp fabric is securely clamped in a damage-free manner by means of the squeezing edge and in so doing a flow resistance of a resin flow, passing through the non-crimp fabric in the region of the squeezing edge is increased with respect to its flow resistance in the cavity, in particular also in the non-crimp fabric section which is not affected by the squeezing edge.

In particular, the squeezing edge can run circumferentially around the entire cavity. The squeezing edge can run in relation to the non-crimp fabric so that the non-crimp fabric lies circumferentially on or respectively over the squeezing edge. The height of the squeezing edge in relation to the height of the cavity can be selected so that the non-crimp fabric, with closed mold, is fixed sufficiently but is not compacted too intensively, so that the evacuating or respectively venting is still guaranteed via the remaining gap, which is partially filled with non-crimp fabric. The geometry of the squeezing edge can be selected so that the non-crimp fabric is sufficiently fixed, without the non-crimp fabric being damaged and/or without the squeezing edge generating an additional necessary closing pressure.

The function of the squeezing edge can therefore be in particular the fixing of the non-crimp fabric, an enabling of the functions of evacuating or respectively venting and the formation of an accumulation stage for the matrix. Hereby, it can be prevented that the matrix emerges selectively prematurely from the cavity which is filled with non-crimp fabric, advances in the outer region of the inner flow front and thereby disturbs the venting of the cavity.

The problem is solved in addition by a tool for high-pressure resin transfer molding, in particular a tool for high-pressure resin transfer molding which is arranged for carrying out the described method, having a first mold half, a second mold half and at least one first sealing device, which is designed to seal the two mold halves off from each other in a final closure position of the tool for high-pressure resin transfer molding, in which the cavity enclosed by the two mold halves can be filled with resin without leakage during the high-pressure resin transfer molding process, and having a second sealing device, which is designed, in a pre-closure position of the tool for high-pressure resin transfer molding, to seal off an opening gap between the first mold half and the second mold half in an air-tight manner such that the cavity enclosed by the two mold halves is able to be evacuated.

In addition to the first and second mold half, the tool for high-pressure resin transfer molding can also have further mold halves, if applicable, for example in order to be able to demold undercuts of the finished shaped part. For opening and closing the cavity, optionally only one of the mold halves can be moved, or two, several or all mold halves can be moved chronologically in succession or simultaneously. The cavity constitutes the hollow space enclosed between the mold halves which is filled with resin for the formation of the shaped part.

In the pre-closure position, in which the second sealing device seals an opening gap between the first mold half and the second mold half in an air-tight manner, the cavity enclosed by the two mold halves is able to be evacuated. In this pre-closure position, a dipping edge gap which is present can be opened so wide that in so doing a flow resistance of a resin flow entering into the dipping edge gap is not yet, or at least not yet substantially increased with respect to its flow resistance in the cavity. In the pre-closure position, an evacuating of the cavity can take place more easily and/or more completely than would be the case if the mold halves were already moved into the final closure position, in which a flow resistance of a resin flow entering into the dipping edge gap were already increased with respect to its flow resistance in the cavity. Here, if applicable, the risk of remaining air inclusions in the inflowing resin or respectively in the shaped part formed by the resin can be reduced. An in particular complete saturation of non-crimp fabrics introduced in the cavity can also be thereby improved. Also, through the second sealing device according to the invention an evacuation of the cavity can begin earlier chronologically, namely already before the two mold halves have reached the final closure position. Thus, the cycle time can also be reduced and therefore the production of shaped parts can become more effective, in particular more cost-efficient.

In the pre-closure position, the first sealing device does not yet lie in a sealing manner against the opposite mold half.

The second sealing device or respectively a flexible seal, which can be, for example, a sealing cord with a hollow chamber, therefore makes it possible to evacuate the cavity in particular in the case of a gap injection even then this is not yet completely closed. Fully compressed, i.e. with a closed mold in the final closure position, this second sealing device is additionally a security in order to guarantee a constant, reproducible mold internal pressure, in order to be able to utilize this as a control parameter.

In the tool for high-pressure resin transfer molding, the second sealing device can have a sealing strip running around the cavity in a closed manner, which is fastened on one of the two mold halves and is constructed such that the sealing strip, in the pre-closure position, lies in an air-sealing manner against the other of the two mold halves and is constructed so as to be compressible such that in the final closure position the first sealing device is applied against this other of the two mold halves in a sealing manner so as to be able to be filled with resin without leakage during the high-pressure resin transfer molding process.

The final closure position can correspond here to a zero application. Such a zero application can be configured circumferentially and ensures that the cavity always closes in an optimum manner and has a constant height. When the zero application is spatially relatively far from the cavity which is to be filled, the risk of contamination or respectively damage to this zero application by non-crimp fabric or respectively matrix is very small. A fixed seal can clearly and constantly delimit the cavity volume here. Thereby, the progress of the mold internal pressure is able to be reproduced clearly and reliably. Therefore, this progress of the mold internal pressure is a clear quality characteristic and can be used for regulating the filling process. The fixed seal can protect the subsequent flexible seal from contact with the matrix and therefore, if applicable, lengthens the service life of the flexible seal up to several times.

In a special embodiment, the first mold half of the tool for high-pressure resin transfer molding can have a groove running around the cavity in a closed manner, into which groove the second sealing device, in particular the sealing strip, is inserted.

Such a circumferential groove can form a vacuum duct and a matrix trap or resin trap. The circumferential groove has a connection to a vacuum unit. By this circumferential duct it is ensured that the vacuum evacuates the cavity optimally in a circumferential manner. The volume of this groove receives excess matrix material, so that the latter can not generate any pressure peaks. The geometry of the groove is configured so that no matrix material wall thicknesses occur which could for example generate a core burning owing to an exothermic reaction.

The sealing strip can have a first, in particular elastic section, which is inserted into the circumferential groove, and a second, in particular elastic section, which in an open position of the tool for high-pressure resin transfer molding projects out from the groove in the direction of the second mold half.

Alternatively or additionally, the sealing strip can be configured as an elastic sealing cord with at least one hollow chamber, in particular a first hollow chamber in the first elastic section and a second hollow chamber in the second elastic section.

In all embodiments of the tool for high-pressure resin transfer molding, the first sealing device can be arranged between the cavity and the second sealing device, in particular the sealing strip, running around the cavity in a closed manner.

The tool for high-pressure resin transfer molding can have a dipping edge gap, the gap width of which is able to be changed by adjusting the distance of the first mold half from the second mold half such that after performing a closing movement by displacing at least one of the two mold halves from the open position into the pre-closure position, the dipping edge gap has a gap width, in which air is able to be evacuated from the cavity via the dipping edge gap, and in particular a flow resistance of a resin flow entering into the dipping edge gap is not yet increased with respect to its flow resistance in the cavity and after performing of a further closing movement by displacing at least one of the two mold halves from the pre-closure position into the final closure position, the dipping edge gap has a reduced gap width with respect to the pre-closure position, in which a flow resistance of a resin flow entering into the dipping edge gap is increased with respect to its flow resistance in the cavity.

Alternatively or additionally to such a dipping edge gap, the tool for high-pressure resin transfer molding can have a squeezing edge which is designed to fix a non-crimp fabric, arranged in the cavity, in correct position between the two mold halves for a saturation with resin such that after performing a closing movement by displacing at least one of the two mold halves from the open position into the pre-closure position, the non-crimp fabric is fixed in correct position by means of the squeezing edge on the one hand between the two mold halves for a saturating with resin, and on the other hand remains sufficiently permeable to air for the evacuating of the cavity, and after performing a further closing movement by displacing at least one of the two mold halves from the pre-closure position into the final closure position, the non-crimp fabric is securely clamped in a damage-free manner by means of the squeezing edge and in so doing a flow resistance of a resin flow, passing through the non-crimp fabric in the region of the squeezing edge is increased with respect to its flow resistance in the cavity, in particular also in the non-crimp fabric section which is not affected by the squeezing edge.

The tool for high-pressure resin transfer molding can also have a resin trap, running around the cavity in a closed manner, in particular configured as a circumferential groove in one of the two mold halves, in particular in the first mold half having the second sealing device, to which resin trap, for the formation of a circumferential vacuum duct through the form of the resin trap a suction duct opens for the connecting of an evacuation pump.

BRIEF DESCRIPTION OF THE DRAWING

An example embodiment of the invention is illustrated by way of example in the enclosed diagrammatic figures. There are shown.

DETAILED DESCRIPTION OF PREFERRED EMBODIMENTS

Figure 1:
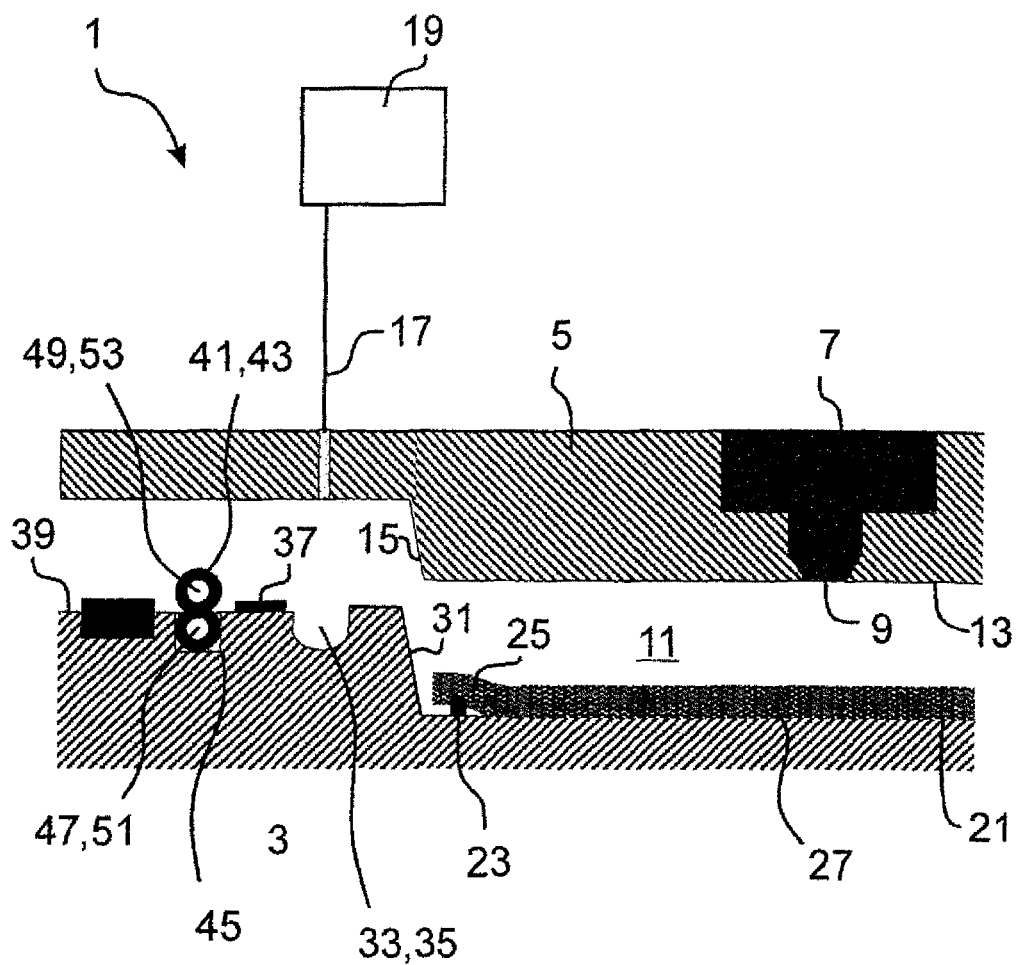
FIG. 1 a diagrammatic partial sectional illustration of an example tool for high-pressure resin transfer molding in an open position, FIG. 2 a diagrammatic partial sectional illustration of the example tool for high-pressure resin transfer molding according to FIG. 1 in a pre-closure position, FIG. 3 a diagrammatic partial sectional illustration of the example tool for high-pressure resin transfer molding according to FIG. 1 in a final closure position, FIG. 4 a top view onto a first mold half of the example tool for high-pressure resin transfer molding, which has the cavity and a resin trap running around the cavity.

In FIG. 1 a portion of a tool 1 for high-pressure resin transfer molding is illustrated in cross-section. The tool 1 for high-pressure resin transfer molding has a first mold half 3 and a second mold half 5. In the illustrated example embodiment, the second mold half 5 has a mixing head 7, which comprises a nozzle outlet 9, via which a matrix, i.e. fluid or plasticized resin is able to be introduced into a cavity 11 delimited by the first mold half 3 and the second mold half 5. The nozzle outlet 9 terminates flush with an upper cavity wall 13 of the second mold half 5. In the upper cavity wall 13 there is introduced in addition an upper dipping edge 15 and a suction duct 17 for connecting, for example, an evacuation pump 19, not illustrated in further detail, basically known to the specialist in the art.

In the illustrated example embodiment, the first mold half 3 has a lower cavity wall 21. Within the cavity 11, the lower cavity wall 21 has a squeezing edge 23. The squeezing edge 23 can be constructed to fix in correct position a non-crimp fabric 27, arranged in the cavity 11, between the two mold halves 3, 5 for a saturation with resin such that after perfoming a closing movement by displacing at least one of the two mold halves 3, 5 from the open position according to FIG. 1 into the pre-closure position according to FIG. 2, the non-crimp fabric 27 is fixed in correct position by means of the squeezing edge 23 on the one hand between the two mold halves 3, 5 for a saturation with resin and on the other hand remains sufficiently permeable to air for the evacuating of the cavity 11, and after performing a further closing movement by displacing at least one of the two mold halves 3, 5 from the pre-closure position according to FIG. 2 into the final closure position according to FIG. 3, the non-crimp fabric 27 is securely clamped in a damage-free manner by means of the squeezing edge 23 and in so doing a flow resistance of a resin flow, passing through the non-crimp fabric 27 in the region of the squeezing edge 23 is increased with respect to its flow resistance in the cavity 11, in particular also in the non-crimp fabric section which is not affected by the squeezing edge 23.

The squeezing edge 23 extends in a closed circumferential manner within cavity 11 and namely in the illustrated example embodiment circumferentially around a margin region 25 of a non-crimp fabric 27. The non-crimp fabric 27 can be, for example, a fiber weave mat, which is saturated, injected around and/or pressed with the matrix or respectively with the resin. To form a dipping edge gap 29 (FIG. 3), the first mold half 3 has a lower dipping edge 31 corresponding to the upper dipping edge 15.

Figure 2:
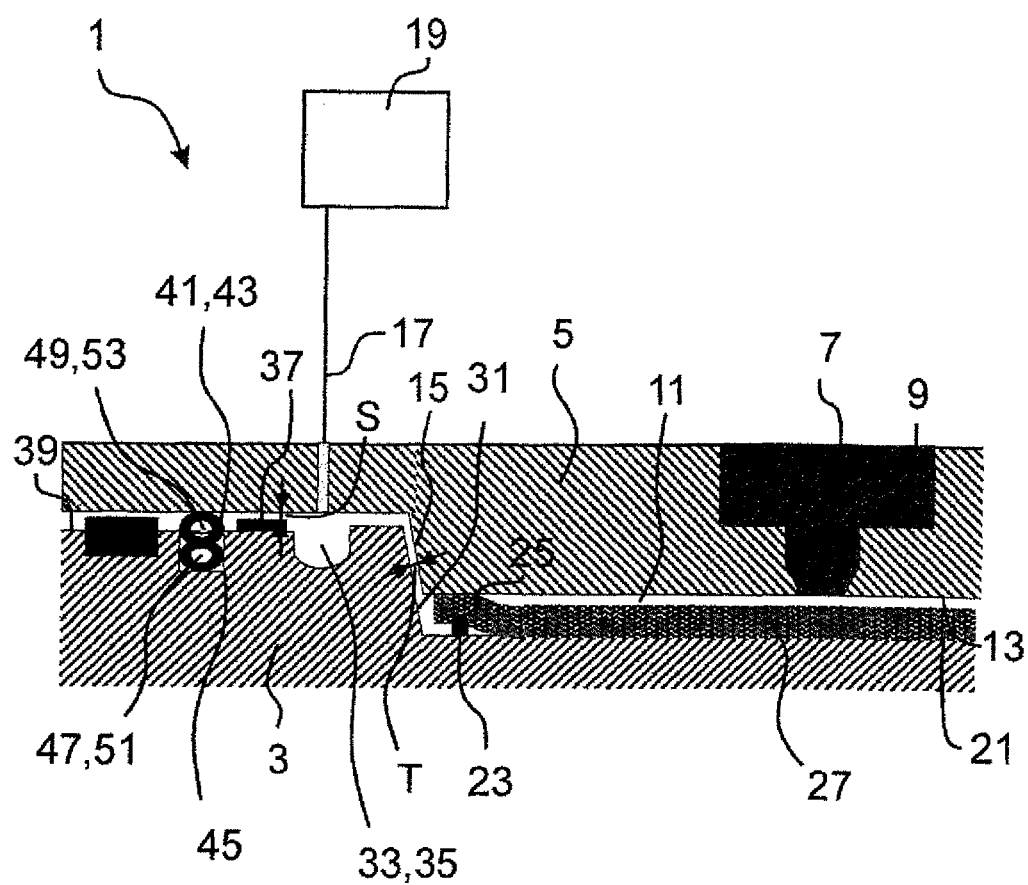
Figure 3:
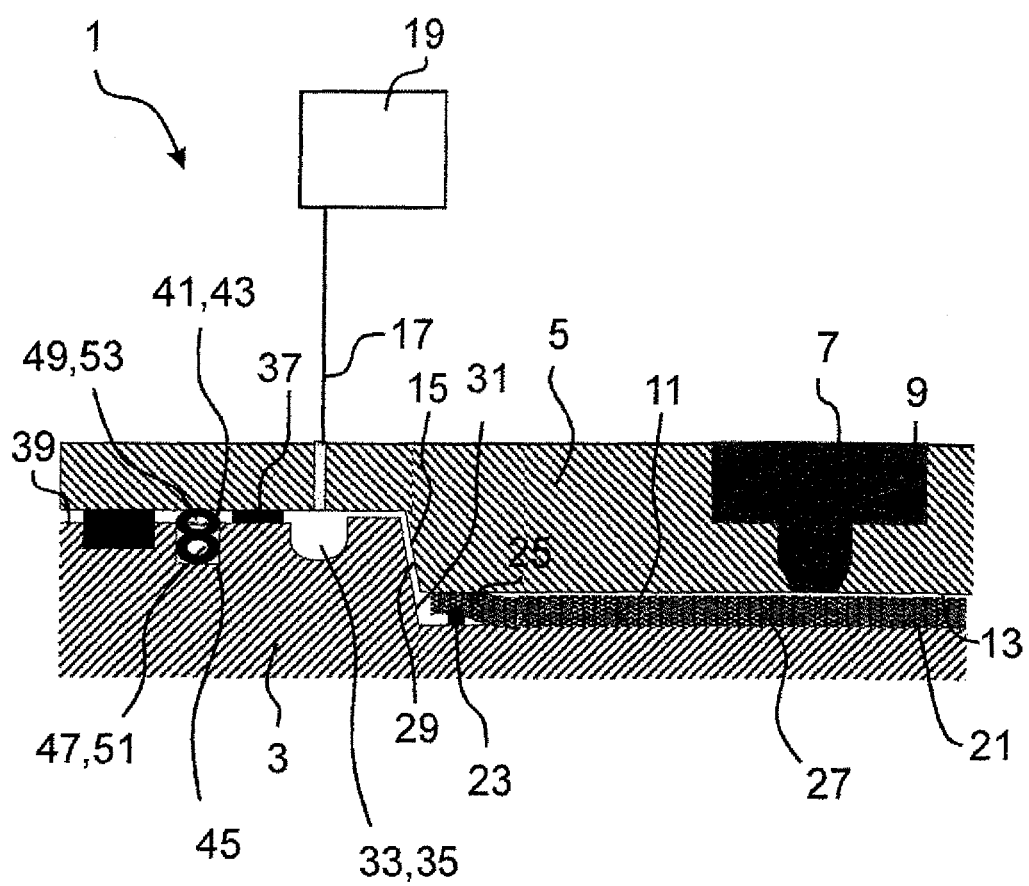

A gap width T of the dipping edge gap 29 can be altered by adjusting the distance of the first mold half 3 from the second mold half 5 such that after performing a closing movement by displacing at least one of the two mold halves 3, 5 from the open position according to FIG. 1 into the pre-closure position according to FIG. 2, the dipping edge gap 29 has a gap width T in which air is able to be evacuated from the cavity 11 via the dipping edge gap 29, and in so doing a flow resistance of a resin flow entering into the dipping edge gap 29 is not yet increased with respect to its flow resistance in the cavity 11, and after performing a further closing movement by displacing at least one of the two mold halves 3, 5 from the pre-closure position according to FIG. 2 into the final closure position according to FIG. 3, the dipping edge gap 29 has a reduced gap width S with respect to the pre-closure position according to FIG. 2, in which a flow resistance of a resin flow entering into the dipping edge gap 29 is increased with respect to its flow resistance in the cavity 11.

Proceeding from the cavity 11 outwards progressively, a resin trap 33 follows the lower dipping edge 31. The resin trap 33 is constructed in the first mold half 3.

Figure 4:
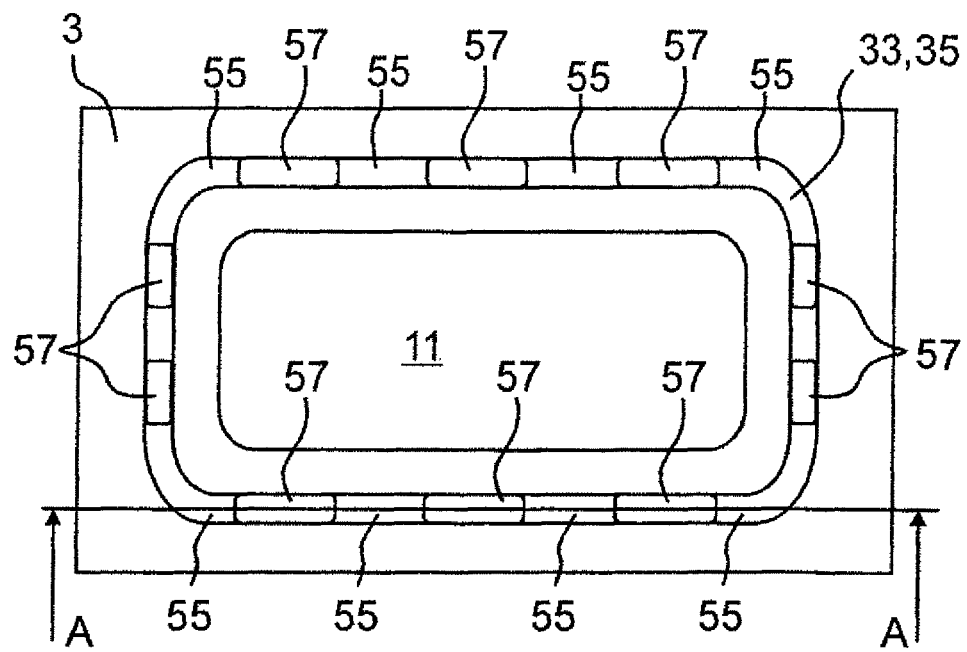

As shown in further detail in FIG. 4, the resin trap 33 forms, through its shape, at the same time a circumferential vacuum duct 35. The suction duct 17 (FIG. 1) is connected to the vacuum duct 35. The resin trap 33 or respectively the vacuum duct 35 is constructed so as to be closed circumferentially around the cavity 11. In the illustrated example embodiment, the resin trap 33 or respectively the vacuum duct 35 is embodied as a circumferential groove in the first mold half 3.

Figure 5:
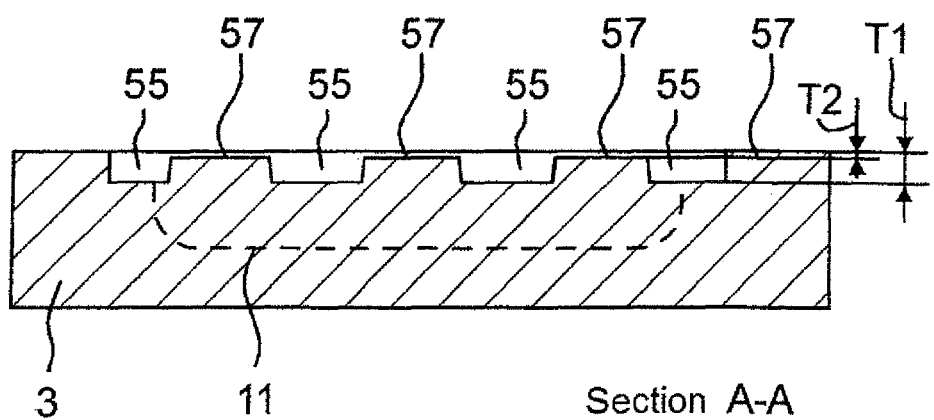
FIG. 5 a sectional illustration through the first mold half according to FIG. 4 along the section line A-A.

The resin trap 33 or respectively the vacuum duct 35 forms a circumferential groove in a closed manner around the cavity 11 in the first mold half 3, to which, for the formation of the circumferential vacuum duct 35 through the shape of the resin trap 33 a suction duct 17 (FIG. 1) opens for connecting an evacuation pump 19. The resin trap 33, in particular the circumferential groove, can, as clearly illustrated in FIG. 5, be dimensioned in first regions 55 of a first depth T1 so that a greater quantity of resin can be received or drawn in in a shorter time than is the case in second regions 57 of a second depth T2. In the second regions 57 of the smaller depth T2 than the depth T2, the groove acts as a flow brake. The second regions 57 of the depth T2 of the groove therefore act in an analogous manner to the dipping edge gap 29 of the gap width T. Resin penetrating in the second regions 57 of the depth T2 is braked more intensively than in the first regions 55 of the depth T1, so that an advancing of the resin in these second regions 57 in particular also in the dipping edge gap 29 is prevented or at least is distinctly reduced. Thus, in the illustrated example embodiment an advancing of the resin is prevented or at least distinctly reduced in sections in regions of the longitudinal edges of the example rectangular cavity 11, where, on the other hand, an efficient flowing of the resin in diagonal directions in the corner regions of the example rectangular cavity 11 is not braked. According to the shape, size, form and/or contour of the cavity 11, the number, shape, size, form and/or contour, in particular the depths of the first regions 55 and of the second regions 57 can be differently configured, in so far as they are constructed to enable a resin flow which is uniform or at least approximately uniform over the circumference through the cavity 11. An undesired advancing of the resin up to a complete filling of the resin trap 33 or respectively of the vacuum duct 35 is to be prevented, because a complete filling of the resin trap 33 or respectively of the vacuum duct 35 would prevent a correct filling of the cavity 11.

On a side of the resin trap 33 or respectively of the vacuum duct 35 lying opposite the dipping edge 31, a first sealing device 37 is arranged in the first mold half 3. The first sealing device 37 is designed to seal off from one another the two mold halves 3, 5 in a final closure position (FIG. 3) of the tool 1 for high-pressure resin transfer molding, in which the cavity 11 enclosed by the two mold halves 3, 5 can be filled with resin without leakage during the high-pressure resin transfer molding process. The first sealing device 37 is in fact shown in FIG. 1 as a separate circumferential strip illustrated in black, but the first sealing device 37 can be constructed in one piece with the first mold half 3. For this, the first sealing device 37 can be formed for example by a projection in a lower mold half wall 39 of the first mold half 3. The first sealing device 37 can be formed in this respect by the metallic material of the first mold half 3. In the illustrated example embodiment, the first sealing device 37 runs in a closed manner circumferentially around the resin trap 33 or respectively the vacuum duct 35 and the cavity 11. By means of the first sealing device 37, the cavity 11 is sealed in a final closure position (FIG. 3) such that the cavity 11 enclosed by the two mold halves 3, 5 can be filled with resin without leakage during the high-pressure resin transfer molding process.

A second sealing device 41 runs likewise in a circumferentially closed manner circumferentially outside the first sealing device 37.

The second sealing device 41 is constructed, in a pre-closure position (FIG. 2) of the tool 1 for high-pressure resin transfer molding to seal an opening gap S between the first mold half 3 and the second mold 5 in an air-tight manner such that the cavity 11 enclosed by the two mold halves 3, 5 can be evacuated.

The second sealing device 41 can, as shown in the illustrated example embodiment, have a sealing strip 43 running around the cavity 11 in a closed manner, which sealing strip is fastened to the first mold half 3 and is constructed such that the sealing strip 43 in the pre-closure position according to FIG. 2 lies in an air-sealing manner against the second mold half 5 and is constructed so as to be compressible such that in the final closure position according to FIG. 3 the first sealing device 37 is applied against the second mold half 5 in a sealing manner so as to be able to be filled with resin without leakage during the high-pressure resin transfer molding process.

For the fastening or respectively mounting of the second sealing device 41 on the first mold half 3, the first mold half 3 can, as illustrated, have a groove 45 running around the cavity 11 in a closed manner, into which groove the second sealing device 41, in particular the sealing strip 43, is inserted.

In a practical embodiment, as illustrated, the sealing strip 43 has an in particular elastic first section 47, which is inserted into the circumferential groove 45, and an in particular elastic second section 49, which in an open position of the tool 1 for high-pressure resin transfer molding projects completely out from the groove 45 in the direction of the second mold half 5.

As illustrated in the figures, the sealing strip 43 can be constructed as a sealing cord with a first hollow chamber 51 in the first elastic section 47 and with a second hollow chamber 53 in the second elastic section 49.

What is claimed is:

1. A method for producing a shaped part, comprising the following steps:
   executing a closing movement by displacing at least one of two mold halves of a high-pressure resin transfer tool from an open position into a pre-closure position of the resin transfer tool such that an opening gap between the mold halves is sealed air-tight by a second sealing device of the resin transfer tool to thereby enclose a cavity;
   evacuating the cavity by pumping air out of the cavity;
   continuing the closing movement by displacing at least one of the two mold halves from the pre-closure position into a final closure position with introducing a resin into a closed cavity, in which the mold halves are sealed against one another by a first sealing device to allow filling of the cavity, enclosed by the two mold halves, with the resin without leakage during a high-pressure resin transfer molding process, wherein in the pre-closure position the first sealing device does not seal one of the mold halves relative to another one of the mold halves, wherein the first sealing device is a flat circumferential strip arranged on one of the two mold halves and closer to the cavity, while the second sealing device is a circumferential sealing strip located farther from the cavity and including a first elastic section having a first hollow chamber and inserted into a groove of the one of the mold halves and a connected second elastic section having a second hollow chamber and in the open position projecting completely out of the groove in a direction of another one of the mold halves, and the second sealing device in the pre-closure position lies against the another one of the mold halves in an air-sealing manner and is compressible such that in the final closure position the first sealing device is applied against the another of the mold halves in a sealing manner to provide filling of the resin without leakage.

2. The method of claim 1 for producing a composite material component made of plastic.

3. The method of claim 1, wherein the cavity is evacuated partially or completely.

4. The method of claim 1, wherein the step of evacuating the cavity is carried out simultaneously with the step of continuing the closing movement from the pre-closure position into the final closure position.

5. The method of claim 1, wherein the step of evacuating the cavity is carried out in the pre-closure position of the resin transfer tool before continuing the closing movement from the pre-closure position into the final closure position.

6. The method of claim 1, wherein the step of displacing the at least one of two mold halves from the open position into the pre-closure position of the resin transfer tool includes adjusting a gap width of a dipping edge gap of the resin transfer tool in the pre-closure position sufficient to allow evacuation of air from the cavity via the dipping edge gap, and wherein the step of continuing the closing movement from the pre-closure position into the final closure position includes reducing the gap width of the dipping edge gap in the final closure position compared to the gap width of the dipping edge gap in the pre-closure position to thereby increase a flow resistance of a resin flow entering into the dipping edge gap compared to a flow resistance of the resin flow in the cavity.

7. The method of claim 1, further comprising the steps of:
arranging in the cavity a non-crimp fabric which is fixed by a squeezing edge of the resin transfer tool between the two mold halves,
allowing the non-crimp fabric to be saturated with the resin while still remaining sufficiently permeable to air for evacuation of the cavity, when the at least one of two mold halves is displaced from the open position into the pre-closure position, and
securely clamping the non-crimp fabric in a damage-free manner by the squeezing edge, when the closing movement is continued from the pre-closure position into the final closure position to thereby increase a flow resistance of a resin flow passing through the non-crimp fabric in a region of the squeezing edge compared to a flow resistance of the resin flow in the cavity.

8. The method of claim 7, wherein the flow resistance of the resin flow is increased in the non-crimp fabric section which is not affected by the squeezing edge.

9. A tool for high-pressure resin transfer molding, comprising:
a first mold half;
a second mold half, wherein at least one of the first and second mold halves is movable in relation to the other one of the first and second mold halves to enclose a cavity between the first and second mold halves in a final closure position for allowing resin to be filled into the cavity without leakage during a high-pressure resin transfer molding process;
a first sealing device configured to seal the first and second mold halves off from each other in the final closure position;
a second sealing device configured not to seal the mold halves relative to one another in an open position of the tool for high-pressure resin transfer molding and is configured to seal off an opening gap between the first mold half and the second mold half in an air-tight manner in a pre-closure position of the first and second mold halves to allow evacuation of the cavity enclosed by the first and second mold halves, and
wherein the first sealing device is configured not to seal the mold halves relative to one another in the pre-closure position,
wherein the first sealing device is a flat circumferential strip arranged on the first mold halve and closer to the cavity, while the second sealing device is a circumferential sealing strip located farther from the cavity and including a first elastic section having a first hollow chamber and inserted into a groove of the first mold halve and a connected second elastic section having a second hollow chamber and in the open position projecting completely out of the groove in a direction of the second mold half, and the second sealing device in the pre-closure position lies against the second the mold halve in an air-sealing manner and is compressible such that in the final closure position the first sealing device is applied against the second mold half in a sealing manner to provide filling of the resin without leakage.

10. The tool of claim 9, wherein the first sealing device is arranged between the cavity and the second sealing device and extends around the cavity in a closed manner.

11. The tool of claim 9, further comprising a dipping edge gap having a gap width which is adjustable in dependence on a distance of the first mold half from the second mold half such that after executing a closing movement by displacing at least one of the two mold halves from an open position into the pre-closure position, the gap width of the dipping edge gap is sized to allow evacuation of air from the cavity.

12. The tool of claim 11, wherein the gap width of the dipping edge gap, after executing the closing movement, is sized such that a flow resistance of a resin flow entering into the dipping edge gap is not yet increased compared to a flow resistance of the resin flow in the cavity, wherein the gap width of the dipping edge gap, after displacing at least one of the two mold halves from the pre-closure position into the final closure position, is smaller than the gap width in the pre-closure position, with a flow resistance of a resin flow entering into the dipping edge gap being greater than the flow resistance in the cavity.

13. The tool of claim 9, further comprising a non-crimp fabric arranged in the cavity, and a squeezing edge configured to fix the non-crimp fabric between the first and second mold halves after displacing at least one of the two mold halves from an open position into the pre-closure position, to thereby allow the non-crimp fabric to be saturated with resin while still remaining sufficiently permeable to air for evacuation of the cavity, said squeezing edge securely clamping the non-crimp fabric in a damage-free manner, after displacing the at least one of the two mold halves from the pre-closure position into the final closure position, with a flow resistance of a resin flow, passing through the non-crimp fabric in a region of the squeezing edge being greater than the flow resistance in the cavity.

14. The tool of claim 11, wherein the flow resistance of the resin flow is increased in the non-crimp fabric section which is not affected by the squeezing edge.

15. The tool of claim 9, further comprising a resin trap sized to extend around the cavity in a closed manner and configured to define circumferential vacuum duct for fluid communication with a suction duct for connection of an evacuation pump.

16. The tool of claim 15, wherein the resin trap is configured as a circumferential groove in one of the two mold halves.

17. The tool of claim 15, wherein the resin trap is configured as a circumferential groove in the one of the first and second mold halves which has the second sealing device.

\* \* \* \* \*